(12) United States Patent
McBrien et al.

(10) Patent No.: US 9,376,920 B2
(45) Date of Patent: Jun. 28, 2016

(54) GAS TURBINE ENGINE COOLING HOLE WITH CIRCULAR EXIT GEOMETRY

(71) Applicant: United Technologies Corporation, Hartford, CT (US)

(72) Inventors: John McBrien, South Glastonbury, CT (US); Brandon W. Spangler, Vernon, CT (US); Matthew A. Devore, Cromwell, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 785 days.

(21) Appl. No.: 13/629,705

(22) Filed: Sep. 28, 2012

(65) Prior Publication Data

US 2014/0090384 A1    Apr. 3, 2014

(51) Int. Cl.
*F01D 5/18* (2006.01)
*F23R 3/00* (2006.01)
*F23R 3/06* (2006.01)

(52) U.S. Cl.
CPC ............... *F01D 5/186* (2013.01); *F23R 3/002* (2013.01); *F23R 3/06* (2013.01); *F05D 2250/14* (2013.01); *F05D 2250/141* (2013.01); *F05D 2250/314* (2013.01); *F23R 2900/00018* (2013.01); *F23R 2900/03042* (2013.01); *Y02T 50/676* (2013.01)

(58) Field of Classification Search
CPC ....................................................... F01D 5/186
USPC ......................................... 415/115; 416/97 R
See application file for complete search history.

(56) References Cited

U.S. PATENT DOCUMENTS

| 4,676,719 A | 6/1987 | Auxier et al. |
| 4,726,104 A | 2/1988 | Foster et al. |
| 4,923,371 A | 5/1990 | Ben-Amoz |
| 5,609,779 A | 3/1997 | Crow et al. |
| 6,092,982 A * | 7/2000 | Ikeda et al. .................. 415/115 |
| 6,155,778 A * | 12/2000 | Lee et al. ...................... 415/116 |

(Continued)

FOREIGN PATENT DOCUMENTS

EP            0851098        7/1998

OTHER PUBLICATIONS

International Search Report and Written Opinion for PCT/US2013/061101 dated of completion of Aug. 13, 2014.

(Continued)

*Primary Examiner* — Igor Kershteyn
*Assistant Examiner* — Woody A Lee, Jr.
(74) *Attorney, Agent, or Firm* — Carlson, Gaskey & Olds, P.C.

(57) ABSTRACT

A gas turbine engine component includes a structure having an exterior surface. A cooling hole extends from a cooling passage to the exterior surface to provide an exit area on the exterior surface that is substantially circular in shape. A gas turbine engine includes a compressor section and a turbine section. A combustor is provided between the compressor and turbine sections. A component in at least one of the compressor and turbine sections has an exterior surface. A film cooling hole extends from a cooling passage to the exterior surface to provide an exit area that is substantially circular in shape. A method of machining a film cooling hole includes providing a component having an internal cooling passage and an exterior surface, machining a film cooling hole from the exterior surface to the internal cooling passage to provide a substantially circular exit area on the exterior surface.

1 Claim, 4 Drawing Sheets

(56) References Cited

U.S. PATENT DOCUMENTS

| | | |
|---|---|---|
| 6,229,113 B1 | 5/2001 | Brown |
| 6,243,948 B1 | 6/2001 | Lee et al. |
| 6,329,015 B1 | 12/2001 | Fehrenbach et al. |
| 6,368,060 B1 | 4/2002 | Fehrenbach et al. |
| 7,019,257 B2 | 3/2006 | Stevens |
| 7,374,401 B2 | 5/2008 | Lee |
| 8,066,482 B2 | 11/2011 | Strohl |
| 8,475,121 B1 * | 7/2013 | Liang .......................... 415/173.1 |
| 8,550,778 B2 * | 10/2013 | Koyabu et al. .............. 416/97 R |
| 2008/0112793 A1 | 5/2008 | Lee et al. |
| 2010/0040478 A1 | 2/2010 | Abdel-Messeh et al. |
| 2010/0129231 A1 * | 5/2010 | Brittingham et al. ........ 416/97 R |
| 2012/0244010 A1 * | 9/2012 | Wei et al. ..................... 416/96 R |
| 2013/0078110 A1 * | 3/2013 | Boyer .......................... 416/97 R |

OTHER PUBLICATIONS

International Preliminary Report on Patentability for PCT/US2013/061101 mail date of Apr. 9, 2015.

* cited by examiner

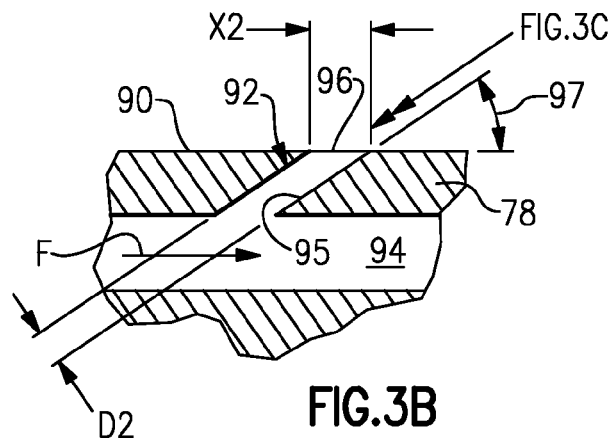
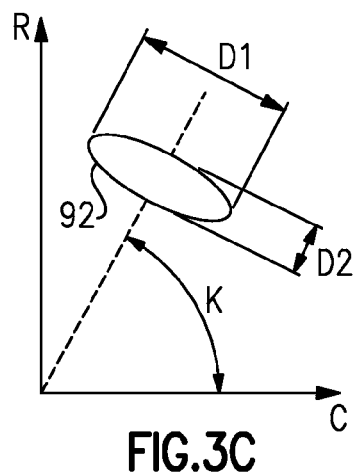
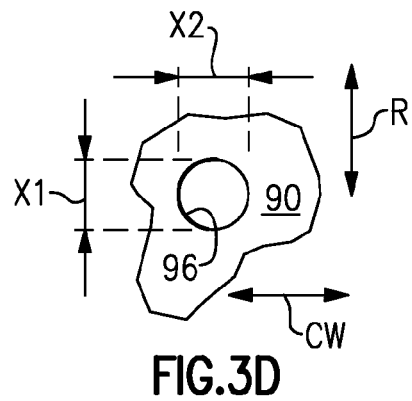
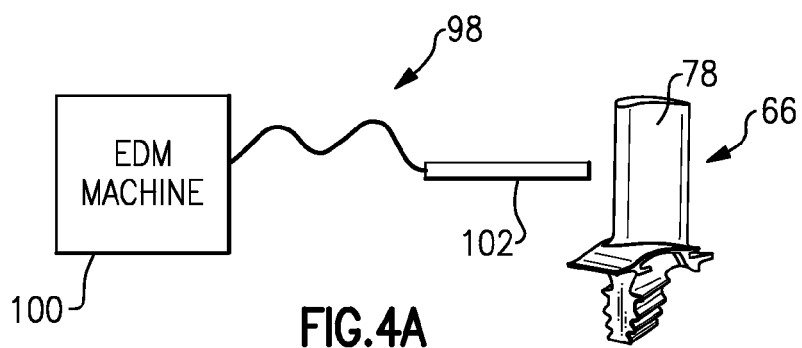
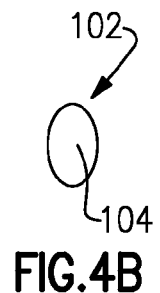

GAS TURBINE ENGINE COOLING HOLE WITH CIRCULAR EXIT GEOMETRY

BACKGROUND

This disclosure relates to cooling holes for gas turbine engine components, such as airfoils. More particularly, the disclosure relates to the exit geometry of the cooling hole on the exterior surface of the component.

Gas turbine engines typically employ stator vanes and rotor blades that have internal cooling passages in airfoil and/or platform. Some internal cooling passages fluidly communicate with cooling holes that exit at the exterior surface of the airfoil and/or platform. Other gas turbine engine components also may incorporate such cooling passages and holes.

Typically, cylindrical cooling holes are provided, which may be machined using a variety of techniques, such as a round, cylindrically shaped electrical discharge machining (EDM) electrode. When the cylindrical holes are drilled into the blade or vane, an elliptical footprint or exit area is provided on the exterior surface of the airfoil. The holes may be susceptible to cracking from thermal mechanical fatigue. The cracks of one hole may propagate and join with cracks of an adjacent hole, which may result in a component that is not suitable for continued used.

SUMMARY

In one exemplary embodiment, a gas turbine engine component includes a structure having an exterior surface. A cooling hole extends from a cooling passage to the exterior surface to provide an exit area on the exterior surface that is substantially circular in shape.

In a further embodiment of any of the above, the cooling hole is provided at an angle that is less than 90° relative to the exterior surface.

In a further embodiment of any of the above, a cross-sectional area of the cooling hole is elliptical.

In a further embodiment of any of the above, the cooling hole is generally linear.

In a further embodiment of any of the above, the exit area substantially circular has a major and minor diameter ratio of 0.9-1.1.

In a further embodiment of any of the above, the ratio is 1.0.

In a further embodiment of any of the above, the major diameter is oriented perpendicular to the cooling hole centerline. The minor diameter is oriented along the cooling hole centerline.

In a further embodiment of any of the above, the structure is a turbine blade airfoil.

In a further embodiment of any of the above, the exit area is provided on a pressure side of the airfoil.

In a further embodiment of any of the above, the structure is a turbine vane airfoil.

In a further embodiment of any of the above, the structure is a turbine blade outer air seal.

In a further embodiment of any of the above, the structure is a combustor panel.

In another exemplary embodiment, a gas turbine engine includes a compressor section and a turbine section. A combustor is provided between the compressor and turbine sections. A component in at least one of the compressor and turbine sections has an exterior surface. A film cooling hole extends from a cooling passage to the exterior surface to provide an exit area on the exterior surface that is substantially circular in shape.

In a further embodiment of any of the above, the exit area substantially circular has a major and minor diameter ratio of 0.9-1.1.

In a further embodiment of any of the above, the ratio is 1.0.

In a further embodiment of any of the above, the component is a turbine blade airfoil.

In a further embodiment of any of the above, the gas turbine engine includes a compressor bleed source in fluid communication with the turbine blade airfoil and is configured to provide cooling flow to the cooling hole.

In another exemplary embodiment, a method of machining a film cooling hole includes providing a component having an internal cooling passage and an exterior surface, machining a film cooling hole from the exterior surface to the internal cooling passage to provide a substantially circular exit area on the exterior surface.

In a further embodiment of any of the above, the machining step includes electrically discharged machining the film cooling hole.

In a further embodiment of any of the above, the electrically discharged machining step includes providing an electrode having an elliptically shaped cross section.

BRIEF DESCRIPTION OF THE DRAWINGS

The disclosure can be further understood by reference to the following detailed description when considered in connection with the accompanying drawings wherein:

FIG. 3B is a cross-sectional view through one of the embodiment cooling holes shown in FIG. 3A taken along line 3B-3B.

FIG. 3C is a view of the embodiment film cooling hole taken along the sight line indicated in FIG. 3B.

FIG. 3D is an enlarged view of an exit area of the embodiment film cooling hole shown in FIG. 3A.

FIG. 4A is a schematic view of an example machining system.

FIG. 4B is an end view of an EDM electrode used to machine the disclosed film cooling hole.

DETAILED DESCRIPTION

Figure 1:
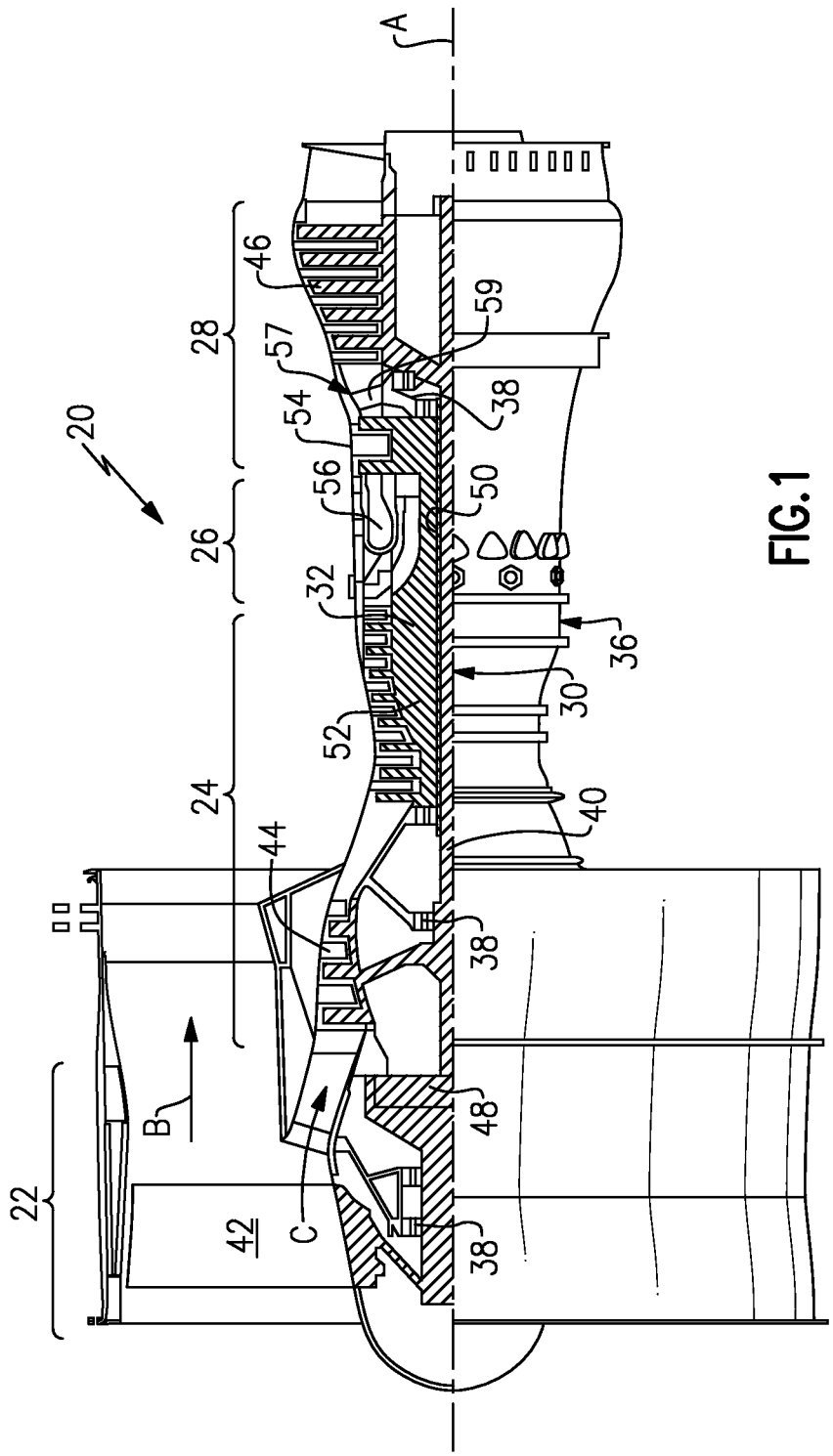
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine engine, a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFCT')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed", as disclosed herein according to one non-limiting embodiment, is less than about 1150 ft/second.

Figure 2A:
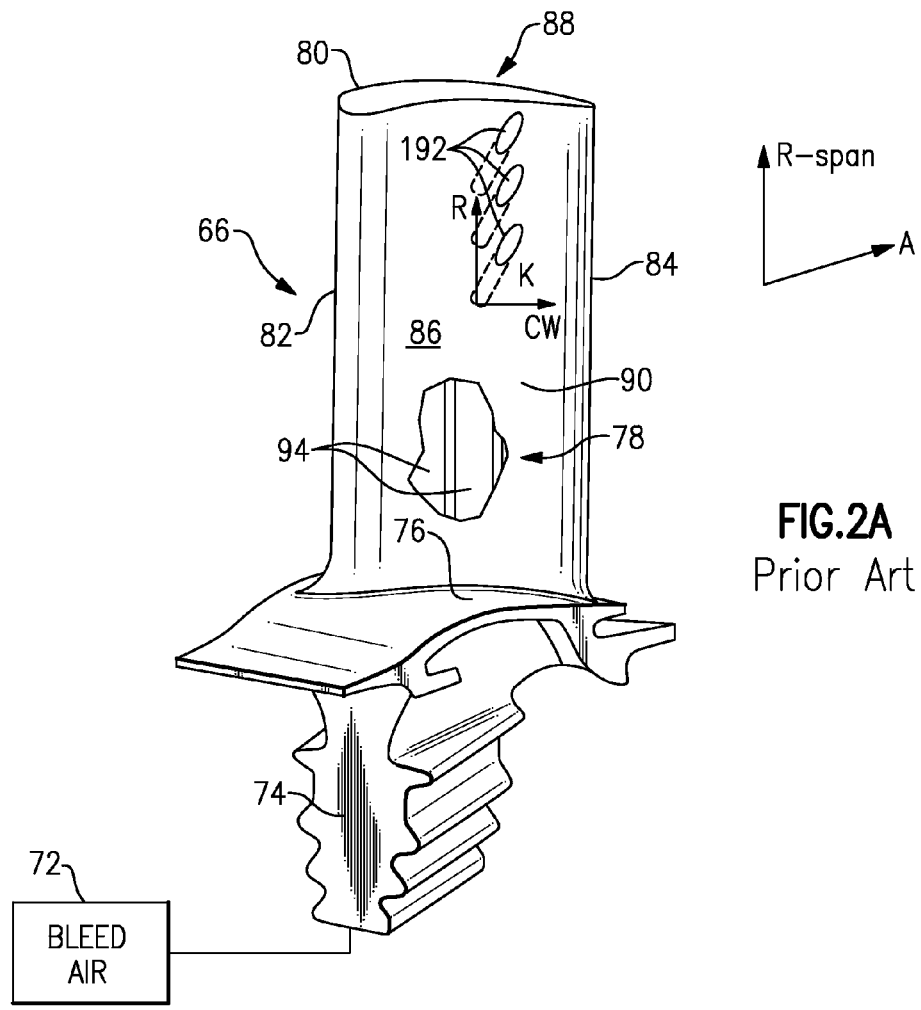
FIG. 2A is a perspective view of the airfoil having a cooling passage and prior art film holes.
Figure 2B:
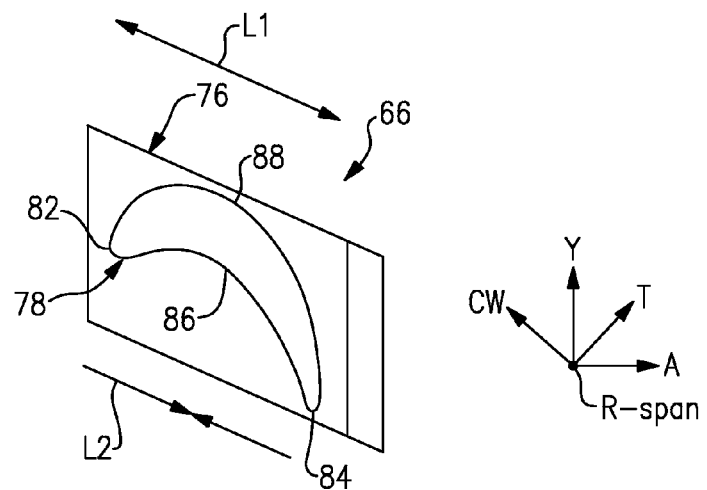
FIG. 2B is a plan view of the airfoil illustrating directional references.

The turbine section 28 includes multiple circumferential arrays of turbine blades 66, an example of which is shown in FIGS. 2A and 2B. A root 74 of each turbine blade 66 is mounted to the rotor disk. The turbine blade 66 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal mounted to a turbine case (not shown).

The airfoil 78 may include cooling passages 94, which receiving cooling flow from a cooling source 72, such as compressor bleed air. Prior art film cooling holes 192 are illustrated in FIG. 2A.

FIG. 2B schematically illustrates exterior airfoil surface extending in a chord-wise direction CW from a leading edge 82 to a trailing edge 84. The airfoil 78 is provided between pressure and suction sides 86, 88 in an airfoil thickness direction T, which is generally perpendicular to the chord-wise direction CW. Multiple turbine blades 66 are arranged circumferentially in a circumferential direction Y. The airfoil 78 extends from the platform 76 in the radial direction R, or spanwise, to the tip 80. The exterior airfoil surface may include multiple film cooling holes 92. The angle formed between the projection of the film hole centerline onto the airfoil surface and the chord-wise direction CW is referred to as clocking angle K. The film holes 92 can be oriented with clocking angles ranging from 0 to 360, but are typically 40 to 70 for a blade.

The shape of the airfoil 78 provides different loading on the pressure and suction sides 86, 88 due to their shape and unequal heating of the airfoil 78. The suction side 88, with its convex shape as shown, is under tensile loads L1, and the pressure side, with its concave shape, is under compressive loads L2. The different loading in the axial/chord-wise directions A, CW has led to thermal mechanical fatigue cracks in the radial direction R starting at film cooling holes.

Typically, round film holes result in elliptically shaped exit areas on the exterior surface with the major diameter of the elliptical exit oriented substantially in the radial direction R and the minor diameter oriented substantially in the chord-wise direction CW (as shown in FIG. 2A), which may be more susceptible to cracks in the radial span direction R due to the changing axial/chord-wise loads.

Figure 3A:
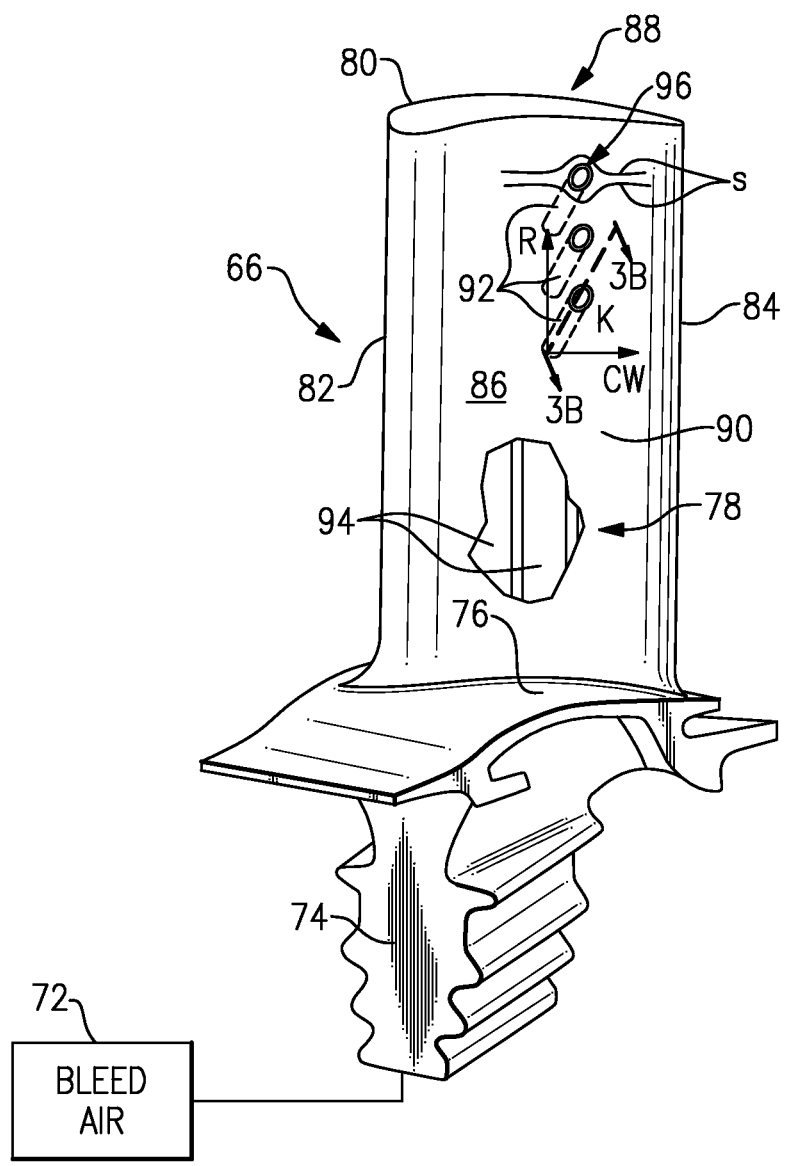
FIG. 3A is a perspective view of the airfoil having a cooling passage and embodiment film holes.

FIGS. 3A-3D illustrate an example film cooling hole for use in, for example, a vane, blade, turbine blade outer air seal, or combustor panel. In the example, the film cooling holes are provided on a pressure side 86 of an airfoil 78, but could also be provided on the suction side 88. As shown in FIG. 3A, the film cooling holes 92 provide an exit area 96 along the exterior surface 90, such that the exit area 96 is substantially circular. "Substantially circular" means that the major and minor diameters X1, X2 of the exit area 96 are approximately equal (e.g., X1/X2 is 0.9-1.1) such that the exit is generally round, best shown in FIG. 3D. As a result, the film cooling holes 92 will be less susceptible to cracking from stress lines S under changing thermal loads, as the stress lines S will be generally symmetrical about the exit area 96.

FIG. 3B represents a plane through the hole centerline and normal to the airfoil surface. Referring to FIGS. 3B and 3C, the film cooling holes 92 communicate with the cooling passage 94, which provides cooling flow F from the cooling source 72. The film cooling holes 92 include feed holes 95 extending from the cooling passage 94 at an angle 97 relative to the exterior surface 90. The feed hole 95 is generally linear in the example. In one example, a typical angle 97 is less than 90° and, for example, in the range of 15°-50°. FIG. 3C is a gun-barrel view of the film hole in FIG. 3B. As can be appreciated from reference to FIG. 3C, the cross-sectional area of the feed hole 95 is not circular, as has been typical. Instead, an elliptical feed hole 95 is provided, which will result in a circular exit area where the film cooling hole 92 meets the exterior surface 90. The elliptical feed hole 95 has a major diameter D1 and a minor diameter D2. The major diameter D1 is oriented substantially perpendicular to the film hole centerline, which is at a clocking angle K relative to chord-wise direction CW, while the minor diameter D2 is oriented substantially parallel to the film hole centerline. The ratio of the major diameter D1 to the minor diameter D2 varies depending upon the angle 97. The minor diameter D2 converges upon the major diameter D1 as the angle 97 approaches 90°. Conversely, the minor diameter D2 diminishes with respect to the major diameter D1 as the angle 97 becomes more acute. In one embodiment, D1=X1; and D2=X2·sin (angle 97).

The film cooling holes 92 may be provided by a variety of machining processes, for example, drilling or EDM machining. An example cooling hole machining system 98 is schematically illustrated in FIG. 4A. The system 98 includes an EDM machine 100 that has an electrode 102. The electrode 102 is used to electrically discharge machine the film cooling hole 92 into a turbine blade 66, for example. Rather than using an electrode 102 with a circular cross-section, the electrode 102 may include an end 104 having an elliptical shape, which corresponds to the desired shaped elliptical feed hole 95 that is configured to provide a substantially circular exit area based upon the angle 97.

Although an example embodiment has been disclosed, a worker of ordinary skill in this art would recognize that certain modifications would come within the scope of the claims. For that reason, the following claims should be studied to determine their true scope and content.

What is claimed is:
1. A method of machining a film cooling hole comprising:
providing a component having an internal cooling passage and an exterior surface;
machining a film cooling hole from the exterior surface to the internal cooling passage to provide an exit area on the exterior surface having a major and minor diameter ratio of 0.9-1.1, wherein the machining step includes electrically discharged machining the film cooling hole, wherein the electrically discharged machining step includes providing an electrode having an elliptically shaped cross section at an angle of 15°-50° with respect to the exterior surface.

\* \* \* \* \*